(12) United States Patent
Yim (10) Patent No.: US 6,917,125 B2
(45) Date of Patent: Jul. 12, 2005

(54) UNINTERRUPTIBLE SWITCHING POWER SUPPLY DEVICE AND METHOD FOR UNINTERRUPTIBLY SWITCHING VOLTAGE

(76) Inventor: Mau Shin Frank Yim, Flat D, 6/F, Block 4, Sheungshui Town Center, Sheungshui, Hong Kong (CN)

( * ) Notice: Subject to any disclaimer, the term of this patent is extended or adjusted under 35 U.S.C. 154(b) by 79 days.

(21) Appl. No.: 10/620,051

(22) Filed: Jul. 11, 2003

(65) Prior Publication Data

US 2004/0017110 A1 Jan. 29, 2004

(30) Foreign Application Priority Data

Jul. 24, 2002 (CN) ........................................ 02134455 A (51) Int. Cl.[7] ............................................... H02J 7/00
(52) U.S. Cl. ....................................................... 307/66
(58) Field of Search ............................... 363/37, 56.01, 363/80; 307/64, 66

(56) References Cited

U.S. PATENT DOCUMENTS 5,909,360 A * 6/1999 Lavin et al. .................. 307/66

6,636,019 B2 * 10/2003 Stevens ....................... 320/128

* cited by examiner

*Primary Examiner*—Adolf Berhane
(74) *Attorney, Agent, or Firm*—James B. Conte; Barnes & Thornburg (57) ABSTRACT

The present invention provides an uninterruptible switching power supply device and a method for uninterruptibly switching from AC input power to DC power, in which a high voltage circuit connected with the primary winding of the main transformer and a lower voltage circuit connected with a tap from the secondary are controlled by a PWM to operate synchronically. When the AC input is normal, the AC input power is transformed the main transformer to power a load. When the voltage of the AC input is lower than the predetermined value, the battery begins to discharge for compensating the power of the AC input. When the AC input is interrupted, the discharge of battery is transformed by the transformer in a self-coupling mode to power the load. The voltage transformation efficiency is improved with the device and method of the invention.

9 Claims, 7 Drawing Sheets

UNINTERRUPTIBLE SWITCHING POWER SUPPLY DEVICE AND METHOD FOR UNINTERRUPTIBLY SWITCHING VOLTAGE

BACKGROUND OF THE INVENTION

1. Field of the Invention

The present invention relates to a switching power supply device, and particularly to an uninterruptible switching power supply device, which is designed to be energized by an AC power source and provided with a DC power source to compensate DC output during brownout or failure of the AC power source.

2. Background of the Prior Art

Conventionally, a switching power supply with favorable voltage transformation efficiency has been widely used in various products such as computers and communication devices. With the advent of computers and their sensitivity to input line voltage (AC power) variations and transients appearing thereon, it has become necessary to provide a regulated DC power source for operation of these computers that is not subject to temporary AC input power failure or intermittent brown-out conditions. However, because of lacking in such a function as uninterruptibly powering a load, those precise electronic equipments are usually still provided with an additional UPS in addition to a switching power supply, which increases the cost.

Chinese patent No. 94221822.1, entitled "An Online Uninterruptible Switching Power Supply Device with Smart Energy Compensation", discloses an uninterruptible switching power supply device. The device comprises a main transformer, a battery, a high voltage switching circuit, a low voltage switching circuit and a pulse width modulator (PWM). The high voltage switching circuit and the low voltage switching circuit both of which are arranged at the side of the primary winding of the main transformer and independent from each other are controlled by the PWM to operate synchronously. The operation principle of the known switching power supply device is inducted energy transformation. However, the efficiency of the inducted energy transformation will be decreased when the voltage of AC input power for energizing the device becomes low. Moreover, the leakage of the magnetic flux existing in the known device results in serious disturbance.

SUMMARY OF THE INVENTION

In view of the disadvantages existing in the prior art, it is an object of the present invention to provide an uninterruptible switching power supply device that is capable of enhancing the efficiency of energy transformation and reducing the cost.

The uninterruptible switching power supply device according to the present invention comprises a main transformer having a primary winding and a secondary winding; a high voltage switching circuit comprising a DC high voltage bus, a high voltage switch, an AC input power being coupled to the primary winding through a rectifying circuit and the DC high voltage bus; at least one low voltage switching circuit comprising a battery, a low voltage switch being coupled to the positive pole of the battery through a diode, and a tap L from the secondary winding of the main transformer; and a pulse width modulator (PWM) unit for controlling the high voltage switching circuit and the low voltage switching circuit to operate synchronically.

Another object of the invention is to provide a method for uninterruptibly switching voltage. The method of the invention that may be used in an uninterruptible switching power supply device comprising a high voltage switching circuit being coupled to the primary winding of a main transformer, at least one low voltage switching circuit including a tap L on the secondary winding which is connected to a battery through a low voltage switch, and a PWM unit for controlling the high voltage switching circuit and the low voltage switching circuit to operate synchronically comprises the steps of a) detecting the AC input and comparing the voltage of the AC input with a predetermined value; and b) selectively driving the high voltage switching circuit and low voltage switching circuit to operate according to the result of the step a) so that the AC input power and the DC power can be selectively transformed by a main transformer to energize a load.

In one embodiment of the method of the present invention, when the step a) shows that the AC input is higher than or at least equals to a predetermined value, the AC input is transformed by the main transformer to generate an inductance voltage on the secondary winding of the main transformer for powering a load.

In another embodiment of the method of the present invention, when the step a) shows that the voltage of the AC input is lower than a predetermined value, the high voltage switching circuit and the low voltage switching circuit are operated synchronically under control of the PWM unit, and the discharge of the battery is connected with the tap of the secondary winding of the main transformer so as to generate a power for compensating the reduced AC power.

In a further embodiment of the method of the invention, when the step a) shows that the AC input equals to zero, the discharge of the battery is coupled to the tap of the secondary winding of the transformer to generate a power for energizing a load.

Other features and advantages of the present invention will be apparent from the following description with reference to the accompanying drawings, in which like reference characters designate the same or similar elements throughout the figures thereof.

BRIEF DESCRIPTION OF THE DRAWINGS

The accompanying drawings, which are incorporated in and constitute a part of the specification, illustrate embodiments of the invention and, together with the description, serve to explain the present invention.

FIGS. 7A–7C are schematic diagrams showing various possible arrangements of the main transformer, in which

DETAILED DESCRIPTION OF PREFERRED EMBODIMENTS

The present invention is designed on the basis of a known physical theory that the efficiency of self-coupling energy transformation is higher than that of inductance energy transformation, in view of the same transformer. And, in view of the same transmission power, the efficiency of transmission of self-coupling energy transformation is higher than that of inductance transformation. By means of combining a self-coupling energy transformation and an inductance energy transformation with a switching power supply, the present invention achieves its purpose of the enhancement of the efficiency of energy transformation as well as the reduction of production cost.

Figure 1:
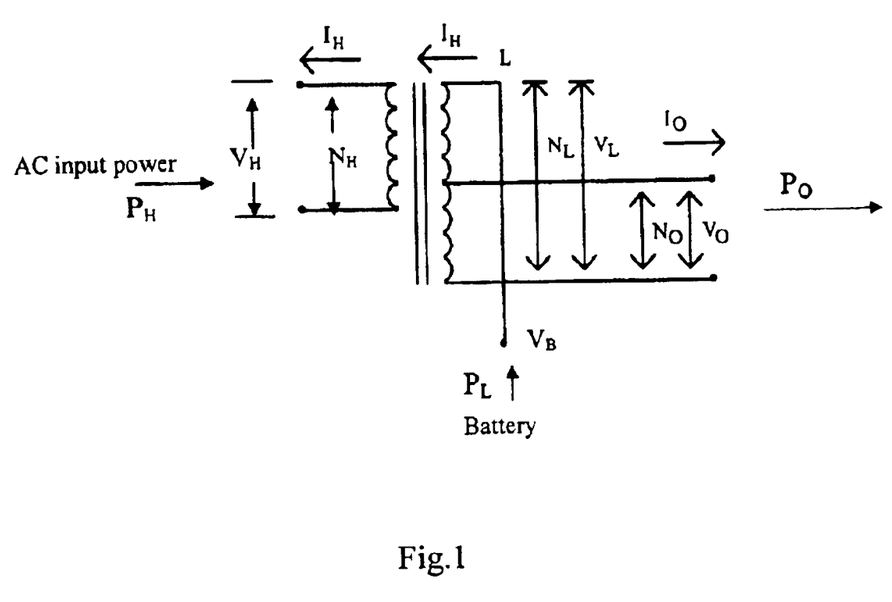
FIG. 1 shows the principle of the present invention for illustrating the switch from an AC high voltage power to a DC low voltage power to uninterruptibly power a load during the AC input power brown-out or failure.

Referring now to FIG. 1 that shows the principle of the present invention, an AC power is input to a primary winding of the main transformer. A second power source that may be a battery is provided and the output of the second power source is connected to a tap L of the secondary winding of the main transformer. Unlike the conventional switching power supply device having only an AC power input, the switching power supply device of the present invention adopts a two-input power, namely, an AC power input and a DC power. According to one embodiment of the present invention, besides a high voltage switching circuit that is arranged at the primary winding of the main transformer for transforming the AC input power to DC output, a low voltage switching circuit is placed at a secondary winding of the main transformer in a self-coupling mode. The high voltage switching circuit arranged at the primary winding of the main transformer and the low voltage switching circuit arranged at the secondary winding are operated synchronically under the control of a PWM so that the AC power and the DC power can be transformed into low voltage DC output during brown-out or failure of the AC input power.

The basic principle of a self-coupling inductance transformer is further explained with reference to FIG. 1.

As shown in FIG. 1, $P_H$ represents the power from the high voltage AC input power source, and $P_L$ represents the power from the low voltage DC power source. The total power output from the transformer is set as $P_o$, then $$P_o=(P_H+P_L)\eta \qquad (1)$$

in which $\eta$ is the efficiency factor of the power transformation of the transformer, and $$P_L=P_o\eta^{-1}-P_H \qquad (2).$$

As shown in FIG. 1, the AC power, after rectified, is input to the primary winding of the transformer through a high voltage switching circuit, which is explained hereinafter. The number of turns of the primary winding is set as $N_H$. The voltage of the AC input power is $V_H$. The induced voltage generated on the secondary winding of the transformer is $V_O$, which is the low voltage DC output from the transformer corresponding to the number of turns $N_O$. The relationship between $V_H$ and $V_O$ follows the equation:

$$V_H/V_O=N_H/N_O \qquad (3).$$

Assuming the tap L is connected with the output of the DC power source through a low voltage switching circuit (which is not shown in this drawing and will be explained hereinafter) driven by a PWM (which is not shown in this drawing and will be described hereinafter) to make the low voltage switching circuit and the high voltage switching circuit operate synchronically, the number of turns of tap L relative to the reference ground is set as $N_L$, the inducted voltage $V_L$ of the tap L is calculated by the following equation:

$$V_L=(N_L V_H)/N_H \qquad (4).$$

Assuming that $V_{Hmin}$ represents the minimum AC voltage when the battery begins to discharge (note: $V_{Hmin}$ might be set as 60%–80% $V_H$ in accordance with the specific requirements of the switching power supply device), the duty factor of the PWM is calculated with the following equation:

$$V_{Hmax}\delta_{min}=V_{Hmin}\delta_{trn} \qquad (5)$$

in which $V_{Hmax}$ represents the maximum AC input voltage when the battery begins to charge, $\delta_{trn}$ represents the duty factor when the battery begins to discharge, and $\delta_{min}$ is the minimum duty factor when the AC input power is normal without brown-out or failure.

In order to keep the output voltage of a switching power supply device stable, $\delta_{min}$ will increase to $\delta_{trn}$ as $V_{Hmax}$ decreases to $V_{Hmin}$. When the voltage of AC power decreases continually, the duty factor $\delta_{trn}$ of the PWM will increase continually and the battery begins to discharge.

As stated above, the switching power supply device according to the present invention is provided with a second DC power source such as a chargeable battery, in addition to the AC input power. The output of the battery is connected with a tap of the secondary winding of the main transformer. The position of the tap is determined as the follow equation:

$$N_L=V_{Bmax}\delta_{min}N_H/V_{Hmin}\delta_{trn}=V_{Bmax}N_H/V_{Hmin} \qquad (6)$$

in which $N_L$ represents the number of turns of the tap L relative to the reference ground, to which the DC power source is connected;

$V_{Bmax}$ represents the maximum voltage of the low voltage DC source at tap L;

$V_{Hmin}$ represents the minimum AC voltage when the battery begins to discharge;

$N_H$ represents the number of turns of the primary winding;

$\delta_{min}$ is the minimum duty factor determined by the highest AC input voltage; and $\delta_{trn}$ represents the duty factor when the battery begins to discharge according to the allowable lowest AC input voltage.

The switch power supply device primarily powers a load by means of its AC input power source until the voltage $V_H$ of the AC power source decreases to $V_{Hmin}$. It means that, if $V_H \geq V_{Hmin}$, the battery does not discharge. When the voltage $V_H$ of the AC power decreases to be lower than $V_{Hmin}$, the inducted voltage $V_L$ will become to be lower than $V_B$. Therefore, the battery begins to discharge for compensating the output power. This is one of the most desirable features of the invention.

Furthermore, when the voltage $V_H$ of the AC input power decreases continually to be lower than $V_{BH}$, namely, $V_H \leq V_{BH}$ ($V_{BH}$ is the inductance voltage at $N_H$ when the discharge of the battery is input to tap L, and $V_H$ is the voltage of the input AC power at $N_H$), the AC input power ceases to supply its power to the load, then $P_H=0$, and $P_L=P_o(\eta^{-1})$, wherein $\eta$ is the efficiency factor of the transformation.

It means that the load is energized by the low voltage DC power source output only. The operation mode of the transformer becomes a self-coupling mode from the inductance mode and the primary winding of the transformer becomes an inductance secondary winding thereof.

The uninterruptible switch power supply device according to the present invention based on the above design principle is given below.

Figure 2:
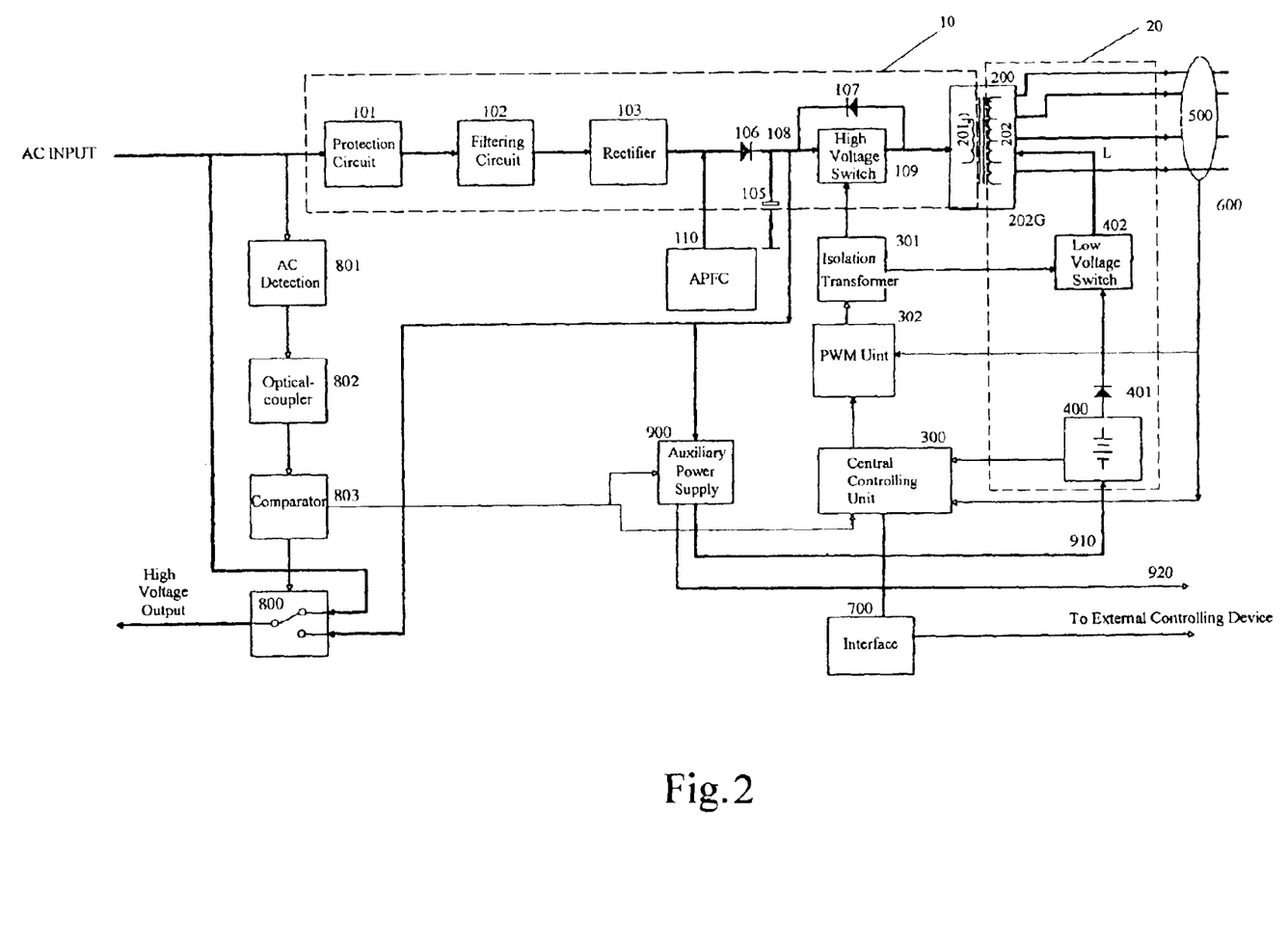
FIG. 2 is a block diagram showing the uninterruptible switching power supply device according to a preferred embodiment of the present invention.

Referring to FIG. 2, the uninterruptible switching power supply device 100 according to the invention is provided with a two-input power, an AC high voltage power source (briefly referred to AC input) and a DC low voltage power source (DC power) and multiple-output terminals for powering a load. As shown in FIG. 2, besides an AC input, a main transformer 200, a pulse width modulator unit (PWM) 302, a battery 400 and an output circuit 500, the device further comprises a high voltage switching circuit 10, and a low voltage switching circuit 20, which will be described in detail hereinafter with reference to FIGS. 3 to 7.

Also referring to FIG. 2, the high voltage switching circuit 10 comprises a DC high voltage bus 108, a high voltage switch 109 and the primary winding 201 of the main transformer 200. The DC voltage bus 108 includes a protection circuit 101, a filtering circuit 102, a rectifying circuit 103, an automatic power factor correction circuit (APFC) 110, a diode 106 and a filtering capacitor 105 (C6). The AC input is rectified by the rectifying circuit 103 through the protection circuit 101 and the filtering circuit 102, resulting in a DC high voltage on the bus 108 which is input to one end M of the primary winding 201 and output from the other end M' of the primary winding to the high voltage switch 109, referring to FIG. 3.

Figure 3:
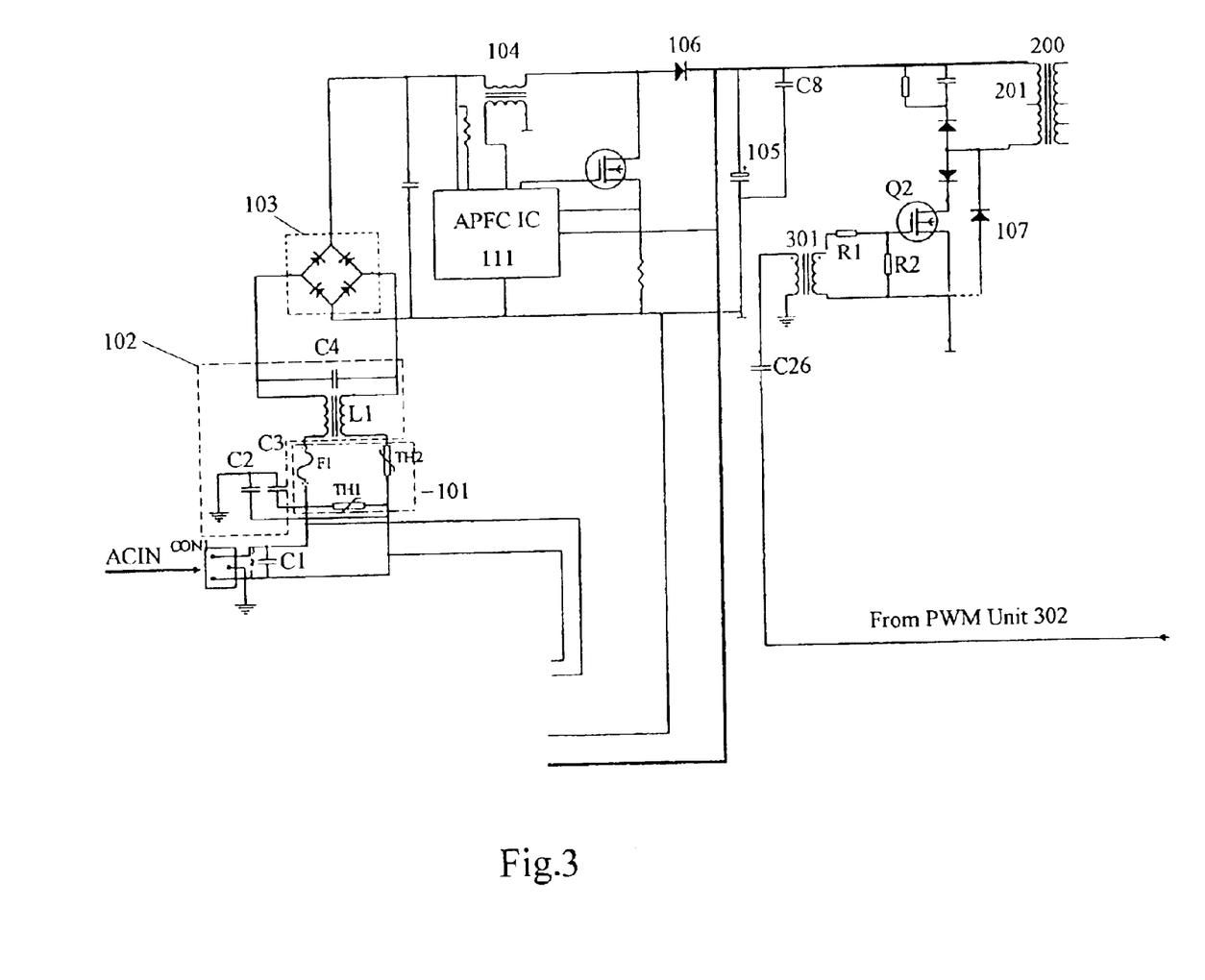
FIG. 3 is a circuit diagram of the high voltage switching circuit as shown in FIG. 1.

FIG. 3 shows one preferred arrangement of the high voltage switch circuit 10 adopted in the uninterruptible switching power supply device of the present invention. The AC input power (ACIN) is input to the rectifying circuit 103 through the protection circuit 101 which may comprise a fuse F1, a striking current suppressor TH1 and a surging voltage suppressor TH2, and the filtering circuit 102 which may include capacitors C2, C3, C4 and an inductance L1, resulting in a DC high voltage which is connected to an end M of the primary winding 201 through the high voltage DC bus 108 including the APFC 110, and the diode 106 and the capacity 105. The current flowing through the primary winding is output from the other end M' of the primary winding to ground through a transistor Q2. As shown in FIG. 3, the APFC 110 includes an APFC IC 111, a transistor Q1, resistors R2 and R3, an inductance 104 and the diode 106. However, those skilled in the art can understand that the present invention is not limited to such an arrangement.

The gate electrode of the transistor Q2 is connected with the secondary winding of an isolation transformer 301 through resistors R5 and R7. The output of the PWM is input to the primary winding of the transformer 301 through C26 under control of a central control unit 300 (to be described hereinafter).

The operation of the high voltage switching circuit 10 is as follows: the AC power is input to the rectifying circuit 103 through the protection circuit 101 and the filtering circuit 102, forming a DC high voltage input power on the bus 108 which is applied to the end M of the primary winding 201 through the inductance 104 and the diode 106.

When the uninterruptible switching power supply device of the present invention operates normally, the DC high voltage is oscillated by Q2 under control of the PWM and the transformer 200 will transform the power to the secondary winding 202 for energizing the load.

When the voltage of the AC input is lower than a predetermined value but higher than zero, for instance, when the 110V AC input decreases to 90V, APFC 110 will be free from the control and the DC high voltage will decrease as the AC input voltage is brown out. At this time, the battery connected with the secondary winding 202 of the transformer 200 begins to discharge for compensating the power.

When the AC input voltage equals to zero (failure of AC power), the output of the device is supplied by the discharge of the battery only. Meanwhile, an inductance voltage generated on the winding 201 is output to the bus 108 through a diode 107 and the capacitor 105 to make it operation continually.

Figure 4:
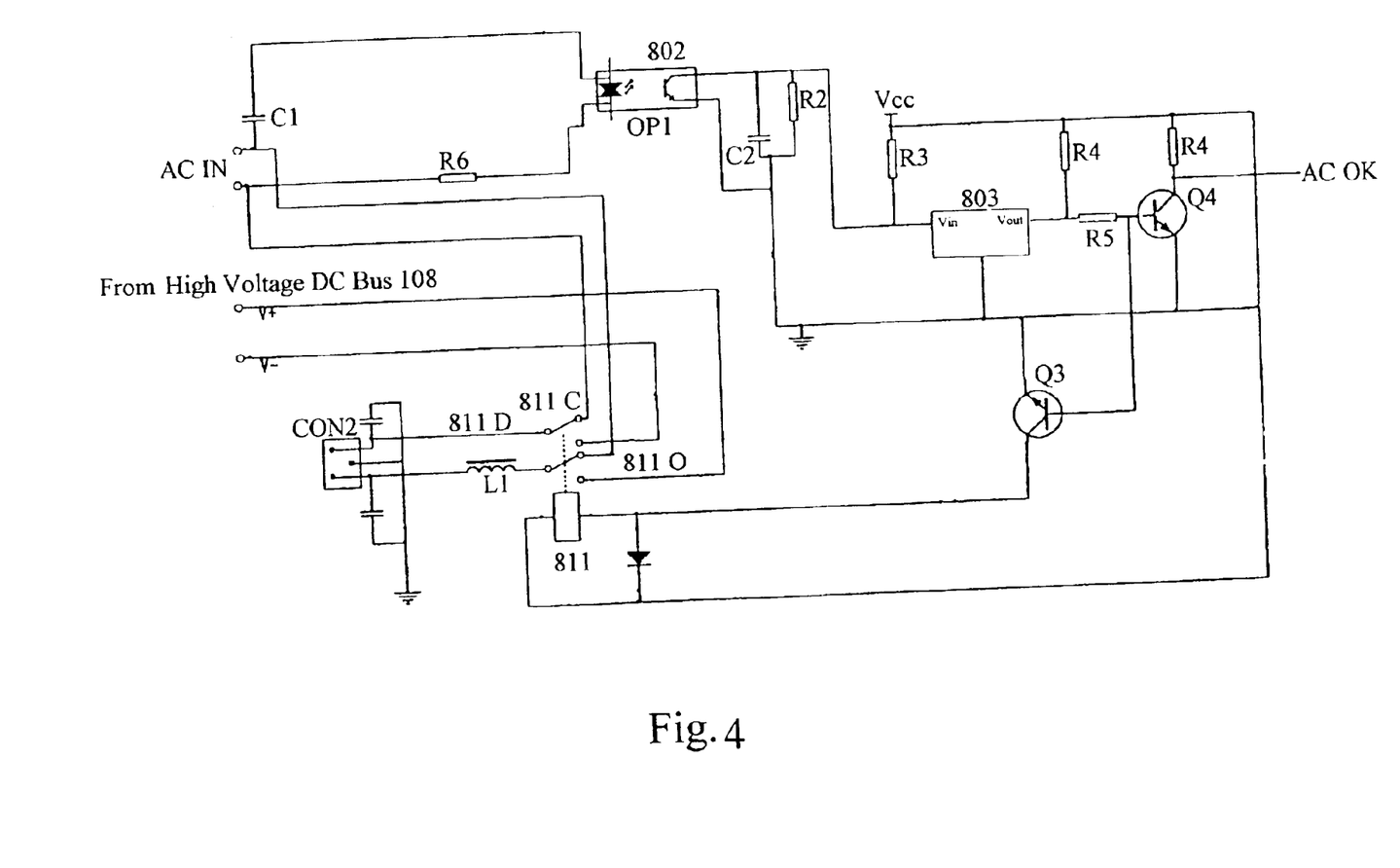
FIG. 4 is a circuit diagram of the high voltage output circuit as shown in FIG. 1.

FIG. 4 shows an arrangement of the high voltage output of the switching power supply device of FIG. 2. The AC power is connected to a contact 811C of the relay 811. The DC high voltage from the high voltage bus 108 is connected to a contact 811O of the relay 811. A contact 811D of the relay 811 is connected with the high voltage output terminal CON2.

The AC detector 801 includes C1, the input of an optical-coupler OP1 and a resistor R13.

The output of the OP1 is connected to the input of a comparator 803 through a capacitor C2, and resistors R2 and R3. The output signal of the comparator 803 is sent to a transistor Q3 through R5 to drive the relay 811. Meanwhile, the comparator 803 also outputs a signal AC OK through a transistor Q4 for indicating the AC power operation is normal.

In detail, when the AC input power is at normal voltage (normal operation), the AC input voltage is applied to the input terminal of OP 1 through C1 and R13, making OP1 turning on to output a low level signal which is input to the comparator 803. The output signal of the comparator 803 becomes a low level accordingly. The low level output signal of comparator 803 is output through Q4 to become a high level AC OK signal so as to charge the battery. In addition, the AC OK signal may be sent to an external load apparatus (e.g. a computer) through a smart interface 700 (as shown in FIG. 2).

When the voltage of the AC input power id lower than a predetermined value, the output signal of the OP1 becomes a high level and the output signal of the comparator 803 becomes a high level accordingly, resulting in a low level output signal of Q4 which stops the battery from being charged. On the other hand, the low level output signal of Q4 is input to the external apparatus to show that no AC power is supplied. Meanwhile, the output signal of the comparator 803 drives the relay 811 through Q3 for outputting a DC high voltage.

Figure 5:
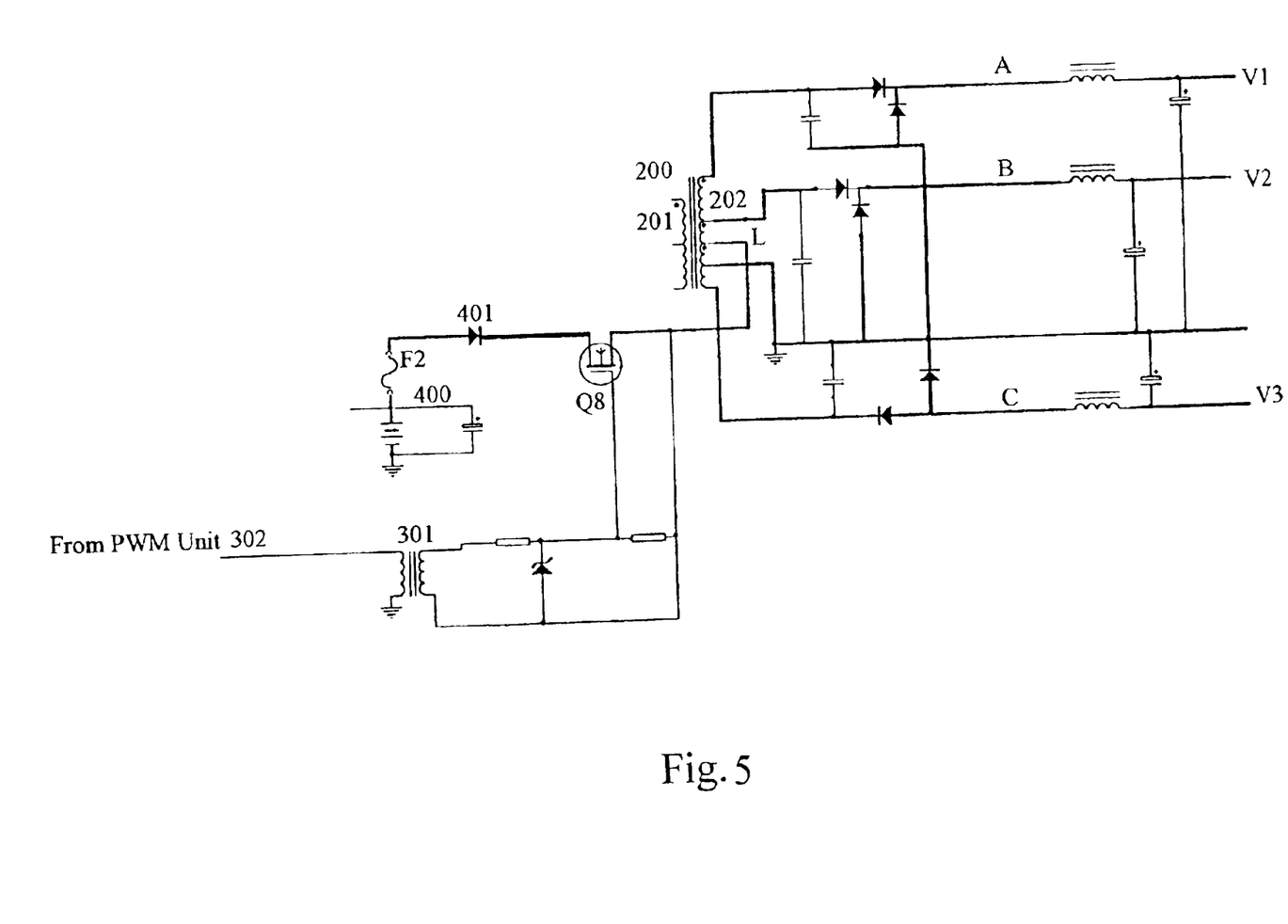
FIG. 5 is a circuit diagram of the low voltage switching circuit and the multi-output terminals as shown in FIG. 1.

FIG. 5 shows a low voltage switching circuit 20 and low voltage multi-output terminals adopted in the uninterruptible switching power supply device of FIG. 2. As shown in FIG. 2 and FIG. 5, the low voltage switching circuit 20 comprises a battery 400, a diode 401, a low voltage switch 402 and the secondary winding 202. The discharge power of the battery 400 is input to a tap L of the secondary winding 202 of the transformer 200 through a diode 401 and a transistor Q8. The number of turns of the tap L relative to the reference ground is determined on the voltage of the battery 400 and calculated according to the method as described above. In addition, the gate electrode of Q8 is connected with the secondary winding of a transformer 301 through R30.

The operation of the low voltage switching circuit 10 is described as follows. When the AC input power is normal (the AC voltage is larger than the predetermined value), although Q8 is driven by PWM through the transformer 301 to operate synchronically with the high voltage switch 109, because of the turns ratio between the primary winding 201, the secondary winding 202 and the tap L, the voltage $V_L$ is larger than the voltage $V_B$ which is output voltage from the battery 400 through the diode 401 and Q8, resulting in no current flowing through Q8 even if it turns on.

When the AC input power is brown out to be lower than the predetermined value, $V_H$ will decrease and $V_L$ will decrease, too. When $V_L$ is lower than $V_B$, the battery begins to discharge to compensate the output power of the device.

When $V_H$ decreases to be lower than $V_{HB}$, which is the inductance voltage of the primary winding 201 generated from the discharge of the battery 400, the load is powered by the discharge of battery only. Meanwhile, $V_{HB}$ is connected through relay 811 with the high voltage output terminal after rectifying and filtering for outputting.

FIG. 5 also shows the output terminals 500 of the uninterruptible switching power supply device. Each of output terminals A, B and C is formed by a specific turns A, B and C of the secondary winding 202 and the respective rectifying and filtering means to supply the DC power with various voltages on the respective output terminals.

Now turning to FIG. 2, the uninterruptible switching power supply device 100 according to the present invention further comprises a central control unit 300 for controlling the PWM according to the change of the AC input power, the DC input power and the output power of the device. In detail, the unit 300 receives the sampling signals of the output terminals of the device, the sampling signals of the output of the battery 400 and the signals from the comparator 803, and compares the received signals with the respective predetermined values so as to implement control. On the other hand, the central control unit 300 also receives the instructions from the external controlling apparatus, such as an external computer, through the interface 700. The central control unit 300 further controls the PWM unit 302. The output of the PWM 302 controlled by the central control unit 300 is connected to the isolation transformer 301. The secondary winding of the isolation transformer 301 is divided into two independent parts for connecting the high voltage switch 109 and the low voltage switch 402, respectively, so that both switches 109 and 402 can be controlled synchronically by the PWM unit 302.

When the battery discharges, as described above, the PWM will adjust its duty cycles according to the decrease of the output voltage of the battery so as to maintain the low voltage output 500 stable. The central control unit 300 will automatically turn off the switching power supply device once the voltage of the battery 400 decreases to a predetermined value.

Figure 6:
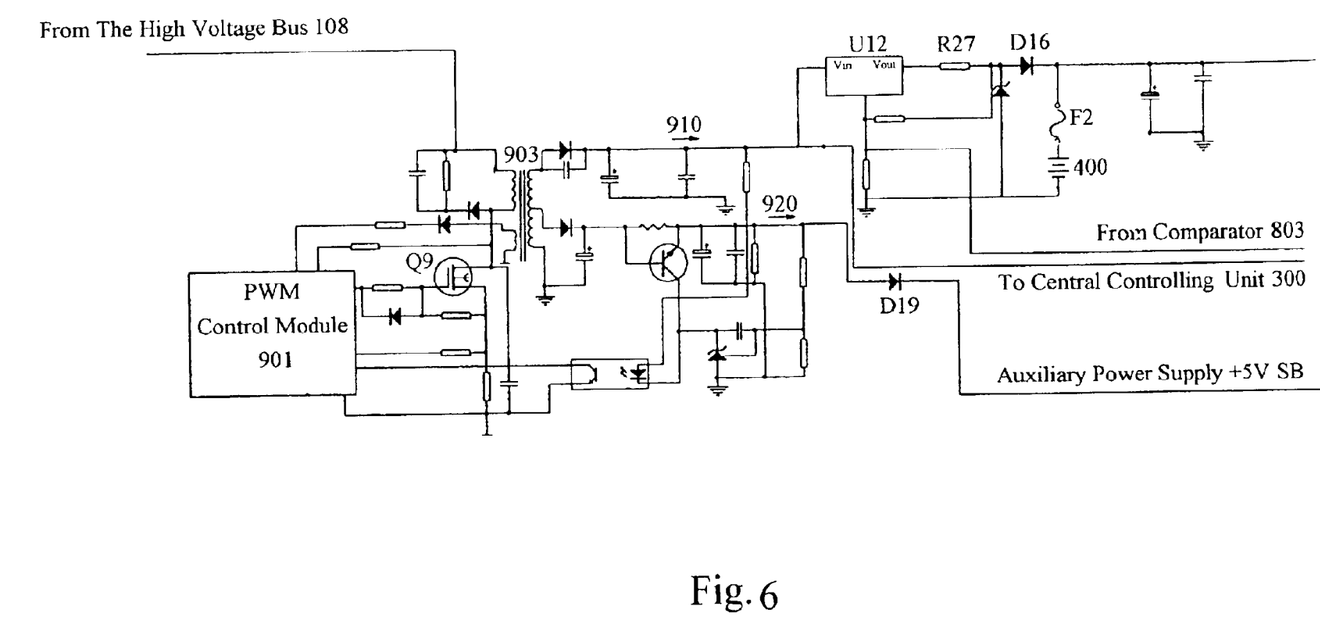
FIG. 6 is a circuit diagram of a charging circuit and an auxiliary power supply unit as shown in FIG. 1.

According to the present invention, the uninterruptible switching power supply device further includes a charging/auxiliary power supply circuit 900 for charging the battery and powering the load. As shown in FIG. 1 and FIG. 6, the input of the circuit 900 is connected with the DC high voltage bus 108 and the output of the same is connected to the battery 400 for charging the battery. The circuit 900 also receives the signals from comparator 803 so as to make sure that the battery is charged only when the AC power is normal. Another output of the circuit 900 is used for powering a load as a back-up power supply. In detail, the DC high voltage is input to a transformer T4. The PWM controlling signal is input to T4 through a transistor Q901. In this way, the output voltage of the secondary winding of T4 is divided into two portions. One is charging voltage which is connected to a current-limiting means U12 and then to battery 400 through R27, D16 and an overload protection means F2 so that the battery 400 is charged. In addition, U12 is controlled by the output of the comparator 803. When the AC input power operates normally, the battery 400 is charged. Otherwise, the charging is stopped. Another divided voltage of the secondary winding of T4 is output to the central control unit 300 for energizing the unit 300. In addition, T4 has an additional output 920 which is regulated by PWM 900 and output to a load through D901 as the back-up power supply of the load.

The uninterruptible switching power supply device of the present invention may be provided with an interface 700 for communicating with an external apparatus such as a computer. In one embodiment, the interface 700 is connected to the external computer by means of an RS232 standard interface.

In the uninterruptible switching power supply device of the present invention, a high voltage DC generation circuit is provided, which comprises the primary winding 201 of the transformer 200 (being used as the secondary winding when conversing power-transformation occurs), a conversing rectifier 107 and a capacitor 105. When the voltage of the AC input power is higher than or at least equal to the predetermined value, the AC input power is output through AC detector 801, OP 802 and comparator 803. Otherwise, when the voltage of the AC input power is lower than the predetermined value, the input AC power is switched to DC power.

The foregoing illustrates the principles of the invention and preferred embodiments of the uninterruptible switching power supply device based on the principles. It will be appreciated that those skilled in the art will be able to devise various arrangements of the present invention.

Figure 7A:
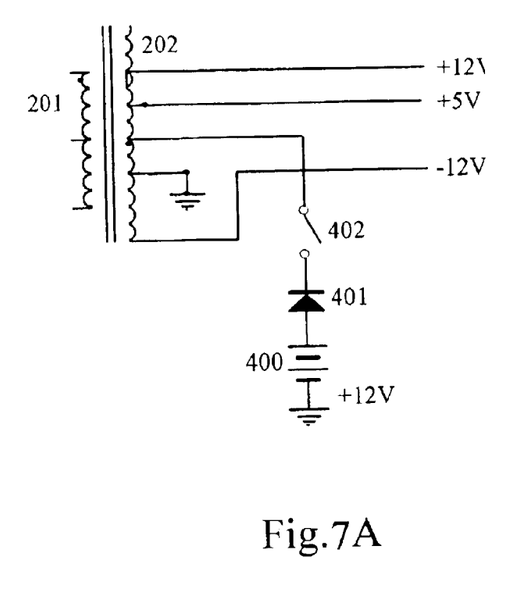
FIG. 7A is a single-end and positive-exciting mode, adopting a second power supply with a lower voltage.
Figure 7B:
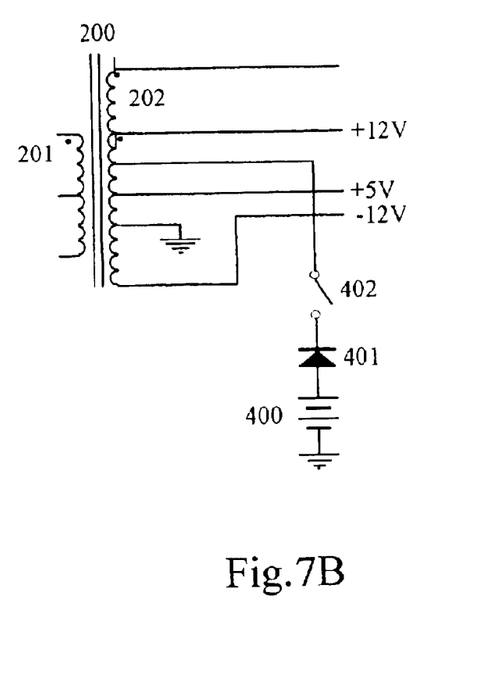
FIG. 7B shows a single-end and positive-exciting mode, adopting a second power supply with a higher voltage.
Figure 7C:
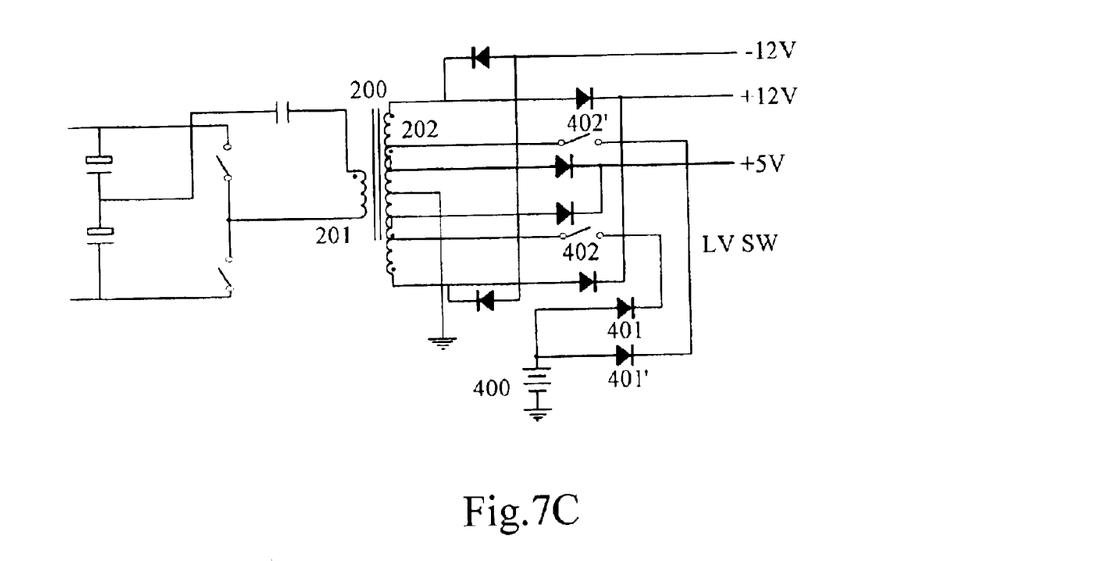
FIG. 7C shows a half-bridge/push-pull mode, adopting a second power supply with a higher voltage.

For instance, the arrangement of the main transformer 200 can be of the single-end and positive-exciting type as shown in FIGS. 7A and 7B, respectively or half-bridge (or push-pull) type as shown in FIG. 7C, or the like.

FIG. 7A shows a main transformer in a single-end and positive-exciting mode adopted in the uninterruptible switching power supply device of the present invention, which includes a second DC power source with a lower voltage, e. g. 12V battery. The low voltage switching circuit consists of the battery 400, an isolation diode 401, a low voltage switch 402 and a tap from the secondary winding 202 of the main transformer 200.

FIG. 7B shows a transformer in a single-end and positive-exciting mode, in which a second DC power source with higher voltage such as +24V is provided. The number of turns of the tap L relative to the reference ground should be increased accordingly. The connection of the low voltage switch circuit is the same as that in FIG. 7A.

FIG. 7C shows a transformer in a half-bridge/push-pull mode, which includes a second power source having higher voltage, e.g. 24V. Two taps from the secondary winding are symmetrically drawn. The central point of the secondary winding is grounded. In this way, the 24V DC power is divided into two paths each of which comprises a diode 401 (or 401'), a low voltage switch 402 (or 402') and tap L (or L').

It is understood that the foregoing description is merely utilized to illustrate the present invention, but not to intend to limit it. Modifications or varieties to the invention that are known well to those skilled in the art should belong to the scope of the invention that is defined by the appended claims.

I claim:

1. An uninterruptible switching power supply device, comprising:

a main transformer (200) having a primary winding (201) and a secondary winding (202);

a high voltage switching circuit (10) comprising a DC high voltage bus (108), a high voltage switch (109), and an AC input power being coupled to the primary winding (201) through a rectifying circuit (103) and said DC high voltage bus (108);

at least one low voltage switching circuit (20) comprising a battery (400), a low voltage switch (402) being coupled to the positive pole of the battery (400) through a diode (401), and a tap L from the secondary winding (202) of the main transformer (200); and a pulse width modulator unit (302) for controlling the high voltage switching circuit (10) and the low voltage switching circuit (20) to operate synchronically; wherein number of turns NL from said tap L to the reference ground is determined by the following equation:

$$NL = V_{Bmax} N_H / V_{Hmin}$$

wherein $V_{Bmax}$ is the maximum discharging voltage of the battery (400) at the tap L, $V_{Hmin}$ is the minimum AC voltage when the battery begins to discharge, and $N_H$ is the number of turns of the primary winding (201) of the main transformer (200).

2. An uninterruptible switching power supply device according to claim 1, wherein one end of said DC high voltage bus (108) is coupled to said AC input power through a protection circuit (101), a filtering circuit (102) and said rectifying circuit (103) in turn, and the other end of the bus (108) is coupled to one end (M) of the primary winding (201) of the main transformer (200).

3. An uninterruptible switching power supply device according to claim 2, wherein the DC high voltage bus (108) further comprises a power factor correction circuit (110) connected between the rectifying circuit (103) and the primary winding (201) of the main transformer (200) through a diode (106).

4. An uninterruptible switching power supply device according to claim 2, wherein said protection circuit (101) comprises a fuse, a surging current suppressor, or a surging voltage suppressor, or a combination thereof.

5. An uninterruptible switching power supply device according to claim 1, further comprising a charging/auxiliary power source (900) being coupled to said DC high voltage bus (108) for charging the battery (400) and providing a back-up power for a load.

6. An uninterruptible switching power supply device according to claim 1, further comprising a high voltage DC generation circuit including a conversing rectifying means (107) and a filtering capacitor (105) connected to one end of the primary winding (201).

7. An uninterruptible switching power supply device according to claim 1, further comprising a DC high voltage output unit including an AC detection circuit (801), an isolation optical coupler (802), a comparator (803) and a relay (800) being connected in series for switching AC output of the relay to DC output when the voltage of the AC input is lower than a predetermined value.

8. An uninterruptible switching power supply device according to claim 1, further comprising an isolation transformer (301) through which the PWM unit (302) controls the high voltage switch (109) and the low voltage switch (402) to operate synchronically.

9. An uninterruptible switching power supply device according to claim 1, further comprising an interface (700).

* * * * *